United States Patent [19]

Brandt

[11] 3,717,049
[45] Feb. 20, 1973

[54] MULTISTAGE WHEEL HUB TRANSMISSION

[75] Inventor: Heinrich Brandt, Wiehl, Germany

[73] Assignee: Bergische Achsenfabrik Fr. Kotz & Sohne, Am Ohlerhammer, Wiehl, Germany

[22] Filed: Aug. 18, 1971

[21] Appl. No.: 172,778

[30] Foreign Application Priority Data

Aug. 20, 1970 Germany..............P 20 41 287.7

[52] U.S. Cl..............................74/750 R, 180/43 B
[51] Int. Cl..........................F16h 3/44, B60k 17/06
[58] Field of Search ....................74/750 R; 180/43 B

[56] References Cited

UNITED STATES PATENTS

| | | | |
|---|---|---|---|
| 1,792,093 | 2/1931 | Holmes | 74/750 R X |
| 2,383,974 | 9/1945 | Kinser | 74/750 R X |
| 2,759,374 | 8/1956 | Bowman et al. | 74/750 R |

FOREIGN PATENTS OR APPLICATIONS 735,977   8/1955   Great Britain......................74/750 R Primary Examiner—Arthur T. McKeon
Attorney—Walter Becker

[57] ABSTRACT

The specification discloses a multistage transmission, especially for driving a wheel hub in which a rotatable shaft coaxial with the hub has mounted thereon a coupling member. Two transmission stages are provided, each with a coupling drum adjacent the coupling member and a further drum connected to the wheel hub is adjacent the coupling member. Coupling elements in the coupling member are adapted for frictionally engaging the drums to couple the drums to the rotatable shaft.

21 Claims, 4 Drawing Figures

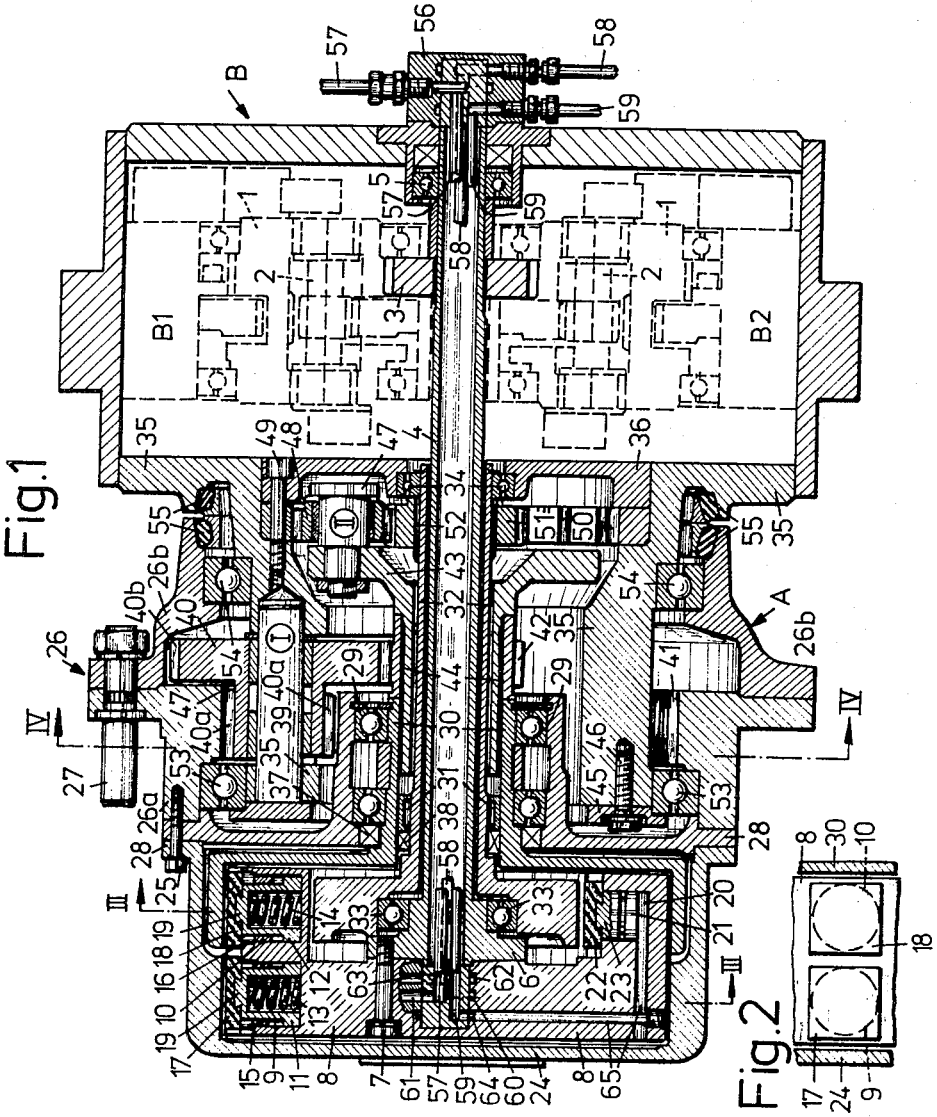

MULTISTAGE WHEEL HUB TRANSMISSION

The present invention relates to a multistage wheel hub transmission, especially for non-railbound vehicles, the transmission stages of which that comprise planetary gears or the like are adapted by coupling means to be coupled to a drive shaft, a hub and a coupling body are also adapted selectively to be coupled to each other.

Multistage wheel hub transmissions of the above mentioned type are generally know. These heretofore known wheel hub transmissions are built in conformity with a principle according to which the couplings respectively associated with the individual transmission stages are as far as the load is concerned arranged in the maximum torque range or in the range of the difference between output torque and input torque. Consequently, the couplings have to be designed correspondingly large and require considerable space. As a result thereof, the heretofore known multistage wheel hub transmissions can be mounted only in relatively large wheels.

It is, therefore, an object of the present invention to provide a multistage wheel hub transmission in which the couplings between input shaft and wheel hub or between the individual transmission stages are arranged in the minimum torque range which means ahead of the individual transmission stages.

It is another object of this invention so to design the wheel hub transmission that its outer dimensions will be considerably reduced over the outer dimensions of heretofore known wheel hub transmissions, and that the wheel hub transmission can easily be arranged in wheels of smaller diameters.

It is still another object of this invention so to design a wheel hub transmission that in completely disengaged position or in response to a defect in the actuating mechanism, for instance a leak in the hydraulic conduits, an automatic arresting brake will become effective.

These and other objects and advantages of the invention will appear more clearly from the following specification in connection with the accompanying drawings, in which:

FIG. 1 is a longitudinal section through a wheel hub transmission according to the invention with the transmission occupying its idling position.

FIG. 2 represents a section taken along the line II — II of FIG. 1.

Figure 3:
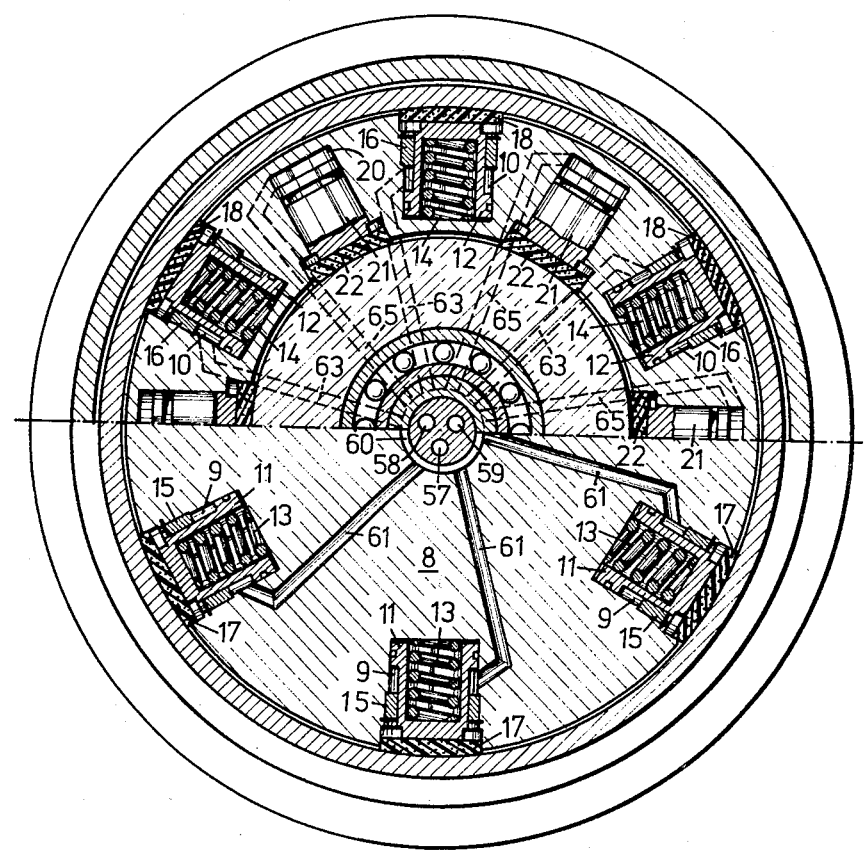
FIG. 3 is a section taken along the line III — III of FIG. 1.
Figure 4:
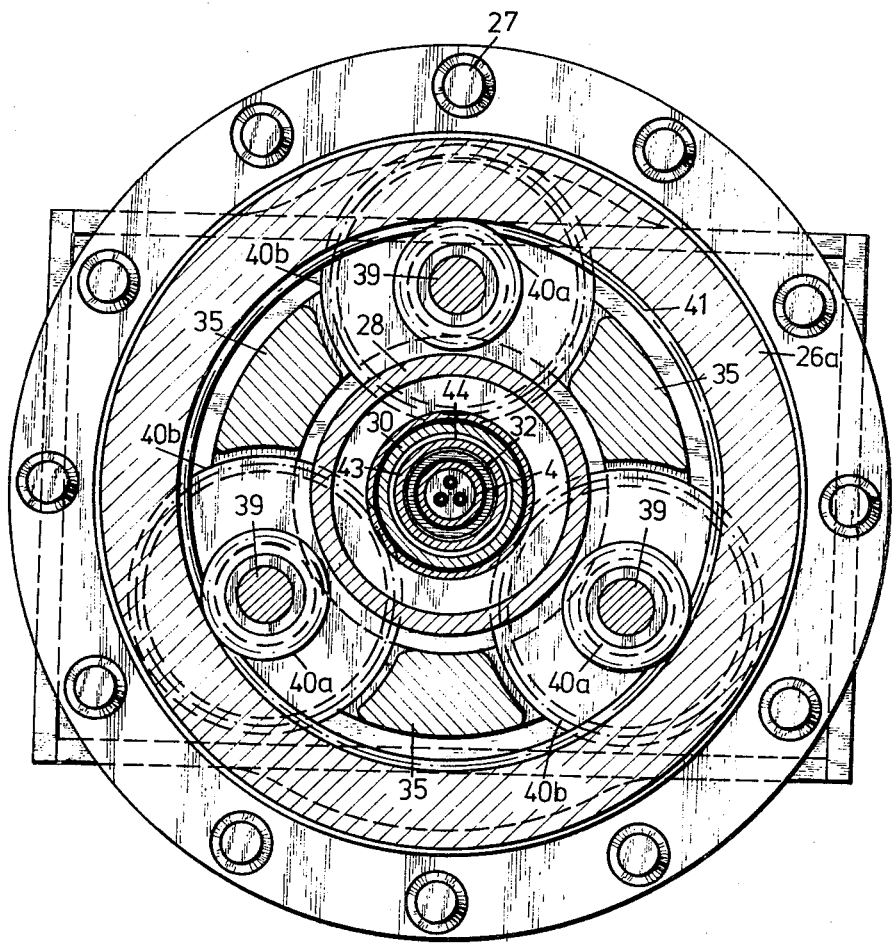

Finally, FIG. 4 represents a section taken along the line IV — IV of FIG. 1.

Starting from the heretofore known multistage wheel hub transmissions, the transmission stages of which comprise planetary gears or the like and are adapted by coupling means to be coupled to a drive shaft or a hub and are selectively adapted to be coupled to each other, the wheel hub transmission according to the present invention is characterized primarily in that the drive shaft is adapted by means of a coupling body fixedly connected to the drive shaft and by means of coupling elements arranged in the coupling body selectively to be coupled through transmission stages to the hub or parallel to the transmission stages directly to a brake drum connected to the hub.

For purposes of realizing this principle of construction, it has proved expedient ahead of and between the transmission stages to provide one coupling sleeve each by means of which selectively one or more transmission stages can be engaged.

A wheel hub transmission designed in conformity with the principle of construction of the present invention has in the embodiment illustrated in the drawings two transmission stages, three different velocities, a control brake and an arresting brake, depending on whether the coupling elements are coupled to one coupling sleeve, both coupling sleeves, or are parallel to the transmission stages directly coupled to the brake drum connected to the hub and to a coupling sleeve, or are only directly coupled to the brake drum connected to the hub. Inasmuch as the coupling elements according to the principle of the present invention are located between the drive shaft and the transmission stages or the coupling sleeves thereof, the coupling elements are located in the minimum torque range regardless of whether the torque is to be conveyed from the drive shaft through the transmission stages to the hub and thereby to the wheel or vice versa from the wheel through the hub and the transmission stages in the direction of the drive shaft and has to be braked.

According to a practical development of the present invention, the coupling body preferably comprises a disc of U-shaped cross section which disc has its outer and inner mantle surfaces provided with cylinder bores for the coupling elements. The cylinder bores may through connecting conduits and annular passages be connected with conduits for the admission and withdrawal of a pressure fluid which conduits are arranged in the drive shaft.

The coupling elements proper expediently comprise piston reciprocably arranged in the cylinder bores and also comprise linings connected to the pistons, which coupling linings may have a polygonal, preferably rectangular, top view and may be inserted into recesses in the outer and inner mantle surfaces of the coupling body.

In order to permit the coupling elements to be used as operating and adjusting brakes, it has proved advantageous to arrange compression springs in the pistons. In view of the action of the compression springs, the linings for the couplings will, when a pressure relief is desired or when a pressure relief accidentally occurs in the conduit system for the pressure fluid, engage the counter surfaces of the linings, in other words will engage the brake drum of the first coupling sleeve.

In order to permit the desired control positions (three velocity ranges, operational and arresting brake), the coupling body has provided therein three separate groups of coupling elements. An outer row of the coupling elements arranged in the outer mantle of the coupling body is adapted to be directly coupled to the brake drum connected to the hub. An inner row of the coupling elements arranged in the outer mantle of the coupling body is adapted to be coupled to the coupling sleeve driving the first transmission stage. Finally, a third group of coupling elements arranged in the inner mantle of the coupling body is adapted to be coupled to the coupling sleeve driving the second and first transmission stages.

A. STRUCTURAL DESIGN OF THE WHEEL HUB TRANSMISSION

Referring now to the drawings in detail, the wheel hub transmission A is driven by a hydromotor B which latter comprises two driving units B1 and B2. The driving units B1 and B2 are driven by a pressure fluid which is supplied by a pump (not illustrated). The pressure fluid acts upon non-illustrated pistons reciprocably arranged in driving cylinder means. These pistons are in pairs connected to a common piston rod. The reciprocatory movement of the piston rods is converted into a rotary movement by means of a crank-shaft 2 which is eccentrically and rotatably journalled in an output wheel 1. For purposes of driving the wheel hub transmission A, also a hydromotor designed in conformity with a different principle may be employed.

The two output wheels 1 of the two driving units B1 and B2 mesh with a driving wheel 3 which is non-rotatably mounted on a hollow drive shaft 4. The drive shaft 4 has one end thereof by means of an antifriction bearing 5 journalled in the housing of the hydromotor B and has its other end which extends into the wheel hub transmission A provided with a flange 6.

Connected to the flange 6 by means of screws 7 is a coupling body 8 which latter has its circumference provided with two rows of cylinder bores 9, 10 which are open toward the outside, these rows being located adjacent to each other. Arranged in the cylinder bores 9, 10 are pistons 11, 12 which by means of compression springs 13, 14 are pressed outwardly. The cylinder bores 9, 10 are sealed toward the outside by rings 15, 16. The free surfaces of pistons 11, 12 have connected thereto coupling linings 17, 18 with dovetailed guiding means 19.

Further cylinder bores 20 open toward the inside are provided between the cylinder bores 10 in that portion of the coupling body 8 which points inwardly. These cylinder bores 20 have reciprocably arranged therein pistons 21 the free outer ends of which have connected thereto coupling linings 22 with dovetailed guiding means 23.

Slipped from the outside over the coupling body 8 is a brake drum 24 the circumference of which is by means of screws 25 connected to a two-sectional hub 26. Hub 26 comprises bearing parts 26a, 26b which are screwed together by means of bolts 27. Between the brake drum 24 and the bearing part 26a of hub 26 there is inserted a bearing support of L-shaped cross section, which support on the inside rests by means of antifriction bearings 29 on a coupling sleeve 30 having a Z-shaped cross-section. The coupling sleeve 30 in its turn is by means of an antifriction bearing 31 journalled on a second coupling sleeve 32 which on one hand rests within the coupling body 8 by means of an antifriction bearing 33 on the flange 6 of the drive shaft 4 and on the other hand rests by means of an antifriction bearing 34 in a bearing support 36 inserted into a housing 35. Between the bearing support 28, the first coupling sleeve 30 and the second coupling sleeve 32 there are provided sealing rings 37, 38. The two transmission stages I and II are arranged between the two coupling sleeves 30, 32 and the hub 26.

The transmission stage I is formed by three planetary gears 40 with two gears 40a, 40b which planetary gears are journalled on bolts 39 in the stationary housing 35. While the smaller gear 40a meshes with an inner gear ring 41 in the bearing part 26a of hub 26, the larger gear 40b rolls on a sun wheel 42. The sun wheel 42 is by means of a planetary gear support 43 non-rotatably connected to the first coupling sleeve 30 while both are connected to the planetary gear carrier 43 by means of splined teeth 44 or the like. The mounting of the bearing bolts 39 in the stationary housing 35 is assured by a ring 45 which by means of screws 46 is connected to the housing 35.

The transmission stage II is formed by three planetary gears 48 mounted on the planetary gear carrier 43 by means of bearing bolts 47. The planetary gears 48 roll on one hand on an inner gear ring 50 which is connected to the bearing support 36 and to screws 49 in the stationary housing 35 and on the other hand mesh with a sun wheel 51 which by means of splined teeth 52 or the like is nonrotatably connected to the second coupling sleeve 32.

Hub 26 is by means of antifriction bearings 53, 54 journalled on those parts of the stationary housing 35 which extends into the transmission stage I. The gap between the bearing part 26b of hub 26 and the stationary housing 35 is sealed by sealing rings 55.

B. FUNCTION OF THE WHEEL HUB TRANSMISSION

The pistons 11, 12, 21 in the coupling body 8 are actuated by a pressure fluid. To this end, that end of the drive shaft 4 which is journalled in the hydromotor B has arranged thereon a rotary connection 56 for various conduits 57, 58, 59. The conduits 57–59 extend through the hollow drive shaft 4 to the coupling body 8. The conduit 57 communicates through an annular passage 60 and additional connecting passages 61 with the cylinder bores 9. The conduit 58 communicates through an annular passage 62 and additional connecting passages 63 with the cylinder bores 10. The conduit 59 communicates through an annular passage 64 and additional connecting passages 65 with the cylinder bores 20.

The structural design of the wheel hub transmission according to the present invention makes it possible in cooperation with the above described conduits to bring about six different control positions:

1. IDLING POSITION

The transmission is shown in the drawings in this control position. The drive is effected from the outside through the wheel to the wheel hub 26 which latter rotates with the antifriction bearings 53, 54 about the stationary housing 35. The cylinder bores 9, 10 are acted upon by pressure fluid so that the coupling linings 17 will not engage the brake drum 24 or the first coupling sleeve 30. The cylinder bore 20, however, is pressure-relieved so that the coupling lining 22 will likewise have no contact with the second coupling sleeve 32. As a result thereof, the planetary gear carrier 43, the first coupling sleeve 30, and the second coupling sleeve 32 can idle when the gear wheel 40a of the transmission stage I rolls on the inner gear ring 41 of hub 26 whereby the planetary gear carrier 43 of the transmission stage II is rotated.

In this control position, the driving units B1 and B2 of the hydromotor B and the drive shaft 4 with the coupling body 8 are at a standstill.

2. FIRST VELOCITY RANGE

The drive is effected from the hydromotor B through the drive wheel 3 and the drive shaft 4. The cylinder bores 9, 10 and 20 are acted upon by the pressure fluid. As a result thereof, the coupling linings 17, 18 do not engage the brake drum 24 or coupling sleeve 30, whereas the coupling lining 22 of the second coupling sleeve 32 is engaged. The torque entered by the hydromotor B, therefore, is conveyed from the coupling support 8 through coupling linings 22, the second coupling sleeve 32, and sun wheel 51 to the second transmission stage II and from the latter through sun wheel 42 to the transmission stage I and from the latter through the inner gear ring 41 to hub 26 and thereby to the wheel. In this control position, both transmission stages II and I are engaged so that the total transmission ratio between drive shaft 4 and hub 26 amounts to approximately 30:1.

3. SECOND VELOCITY RANGE

The drive is effected from the hydromotor B through drive shaft 4 and coupling body 8. The cylinder bores 9 are acted upon by pressure fluid, whereas the cylinder bores 10 and 20 are pressure-relieved. As a result thereof, the coupling linings 17 have no contact with the brake drum 24, and coupling linings 22 have no contact with the second coupling sleeve 32, whereas the coupling linings 18 are coupled to the first coupling sleeve 30. The torque entered by the drive shaft 4 into the wheel hub transmission A is in this control position conveyed from the coupling support 8 through coupling linings 18, the first coupling sleeve 30, the sun wheel 42, and the transmission stage I to the inner gear ring 41 of hub 26 and thereby to the wheel.

The second coupling sleeve 32 and the planetary gear carrier 43 are in this control position idling with the transmission stage II. The stepdown ratio from the drive shaft 4 to hub 26 will in this control position amount to 10/1.

4. THIRD VELOCITY RANGE (HIGH SPEED)

The drive is effected from the drive shaft 4 through the coupling body 8. The cylinder bores 9 and 20 are pressure-relieved, whereas the cylinder bores 10 are acted upon by pressure fluid. As a result thereof, only the coupling linings 17 are in contact with the brake drum 24 whereas the coupling linings 18 and 22 are lifted off the first coupling sleeve 30 and the second coupling sleeve 32. Therefore, the torque is conveyed from the drive shaft 4 through coupling body 8 and coupling linings 17 directly to the brake drum 24 and thus to the hub 26 and the wheel. The speed of the wheel is equal to the speed of the drive shaft 4.

5. OPERATIONAL BRAKE

With this control position, first the hydromotor B is disengaged so that no torque can any longer be conveyed to the drive shaft 4. The cylinder bore 10 is pressure-relieved so that the coupling linings 18 of the first coupling sleeve 30 are in engagement. The cylinder bores 20 are likewise pressure-relieved so that the coupling sleeves 22 are lifted off the second coupling sleeve 32. The desired braking force may now be generated by causing pressure fluid to act upon the cylinder bores 9. To this end, the power flow between the coupling linings 17 and the brake drum 24 is controlled. In this connection it is particularly important that the brake moment between the brake drum 24 and coupling linings 17, in conformity with the stepdown ratio between the inner gear ring 41 on hub 26 and the coupling body 8, is less than the brake moment on the wheel.

When the transmission stage I engaged between the hub 26 and the brake drum 24 has a stepdown ratio of 10/1, also the wheel torque is reduced to a brake torque at a ratio of 10/1. This advantage of the wheel hub transmission according to the invention permits very small dimensions for the brake drum 24 and the coupling linings 17.

6. ARRESTING BRAKE (EMERGENCY BRAKE)

The hydromotor B is disengaged so that no torque can be transmitted and conveyed through drive shaft 4 to the coupling body 8. The cylinder bores 9, 10 and 20 are pressure-relieved so that the coupling linings 17, 18 of the brake drum 24 or the first coupling sleeve 30 engage each other whereas the coupling linings 22 are lifted off the second coupling sleeve 32. In this control position, a braking effect is exerted upon hub 26 in view of the positive power connection between the coupling linings 17 and the brake drum 24 on one hand and the coupling linings 18 and the first coupling sleeve 30 on the other hand. As a result thereof, the brake drum 24 and the first coupling sleeve 30 rotate opposite to each other.

Also with this control position, the brake torque between the coupling linings 17 and the brake drum 24 is, in conformity with the stepdown ratio brought about by the transmission stage I, less than the wheel torque.

It is, of course, to be understood that the present invention is, by no means, limited to the particular construction shown in the drawings but also comprises any modifications within the scope of the appended claims.

What is claimed is:

1. A multistage transmission for driving a vehicle wheel hub and comprising a stationary member; a shaft driven in rotation and extending from said stationary member, a coupling body concentric with said shaft and fixed thereto at the end of the shaft opposite said stationary member, first and second transmission stages of respective ratios between said stationary member and said coupling body, each having an input member concentric with said shaft, said first transmission stage having an output member drivingly connected to said wheel hub and said second transmission stage having an output member drivingly connected to the input member of said first transmission stage, a wheel hub concentric with said shaft, and coupling members in said coupling body selectively coupling said coupling body to either one of said input members of said first and second transmission stages or to said wheel hub.

2. A multistage transmission according to claim 1 which includes first and second sleeves fixed to the input members of said first and second transmission stages respectively and extending in concentric relation to each other and to said shaft to the region of said coupling body, first and second drum elements on said first and second sleeves respectively and telescopically overlapping said coupling body, a third drum element fixed to said wheel hub concentric with said shaft and also telescopically overlapping said coupling body, said coupling members in said coupling body comprising respective coupling members engageable with each of said drum elements.

3. A multistage transmission according to claim 2 in which said coupling body is U-shaped in cross section and presents external and internal cylindrical surfaces to said drum elements, and radial cylinder bores in said coupling body extending through said surfaces, said coupling members comprising pistons reciprocably mounted in said bores.

4. A multistage transmission according to claim 3 which includes passage means extending from said cylinder bores through said coupling body to said shaft and axially in said shaft.

5. A multistage transmission according to claim 3 in which said coupling members comprise shoes of friction material on the outer ends of said pistons.

6. A multistage transmission according to claim 5 in which each shoe is non-circular when viewed in the radial direction of said coupling body, said coupling body having shoe receiving recesses of the same shape as said shoes formed therein at the mouth of each cylinder bore and in which recesses said shoes are confined against rotation.

7. A multistage transmission according to claim 3 which includes compression springs acting between the pistons in the radially outwardly opening bores in said coupling body and the bottoms of the respective bores.

8. A multistage transmission according to claim 3 in which the drum element fixed to said wheel hub is disposed in surrounding relation to that axial portion of said coupling body which is remote from said transmission stages.

9. A multistage transmission according to claim 3 in which the drum element fixed to said first sleeve is disposed in surrounding relation to that axial portion of said coupling body which is nearest said transmission stages.

10. A multistage transmission according to claim 3 in which the drum element fixed to said second sleeve is disposed inside said coupling body.

11. A multistage transmission according to claim 3 in which said drum element fixed to said wheel hub and the drum element fixed to said first sleeve surround said coupling body in end to end relation with the drum element fixed to said wheel hub most remote from said transmission stages while the drum element fixed to said second sleeve is disposed inside said coupling body.

12. A multistage transmission according to claim 3 in which said second sleeve is journalled on said drive shaft adjacent said coupling body and on said stationary member.

13. A multistage transmission according to claim 12 in which said first sleeve is journalled on said wheel hub and on said second sleeve.

14. A multistage transmission according to claim 3 in which said transmission stages are planetary gear transmissions, each transmission having a sun gear forming the input member thereof and each said sleeve being fixed to the sun gear of the respective transmission.

15. A multistage transmission according to claim 14 in which each transmission includes planet gears and a planet gear carrier and the said first sleeve is non-rotatably connected to the planet gear carrier of said second transmission, said planet gear carrier of said second transmission forming the output member thereof.

16. A multistage transmission according to claim 15 in which said stationary member is the planet carrier for the planet gears of said first transmission.

17. A multistage transmission according to claim 16 in which said stationary member is formed with recesses in which the planet gears of said first transmission are disposed.

18. A multistage transmission according to claim 3 in which said wheel hub surrounds said transmission stages and is formed in axial portions, said portions being fixed together and meeting in a plane perpendicular to said shaft and located in the region of said first transmission stage.

19. A multistage transmission according to claim 18 in which said wheel hub is journalled on said stationary member.

20. A multistage transmission according to claim 16 in which said first transmission has a ring gear forming the output member thereof and fixed to said wheel hub and said second transmission has a ring gear fixed to said stationary member.

21. A multistage transmission according to claim 4 which includes a rotary fluid connector on said shaft at the end thereof adjacent said stationary member for connecting fluid conduits to said passage means in said shaft.

* * * * *